United States Patent [19]
Ishizaki et al.

[11] Patent Number: 5,752,217
[45] Date of Patent: May 12, 1998

[54] NAVIGATION SYSTEM HAVING OPTIMAL DESTINATION ROUTE SETTING CAPABILITY

[75] Inventors: Takashi Ishizaki, Kariya; Hidetoshi Fujimoto, Toyokawa, both of Japan

[73] Assignee: Nippondenso Co., Ltd., Kariya, Japan

[21] Appl. No.: 653,268

[22] Filed: May 24, 1996

[30] Foreign Application Priority Data

May 30, 1995 [JP] Japan .................................. 7-131751

[51] Int. Cl.⁶ ............................................. G01C 21/00
[52] U.S. Cl. ............................................. 701/201; 701/209
[58] Field of Search ........................... 364/444.1, 444.2, 364/449.1, 449.2, 449.3, 449.7; 701/201, 202, 207, 208, 209, 213; 340/988, 995; 73/178 R

[56] References Cited

U.S. PATENT DOCUMENTS

| 5,031,104 | 7/1991 | Ikeda et al. | 364/449 |
| 5,122,959 | 6/1992 | Nathanson et al. | 364/436 |
| 5,410,485 | 4/1995 | Ichikawa | 364/444 |
| 5,459,667 | 10/1995 | Odagaki et al. | 364/444 |
| 5,486,822 | 1/1996 | Tenmoku et al. | 340/995 |
| 5,523,765 | 6/1996 | Ichikawa | 342/451 |
| 5,568,390 | 10/1996 | Hirota et al. | 364/449 |

FOREIGN PATENT DOCUMENTS

| 58-223017 | 12/1983 | Japan . |
| 63-016220 | 1/1988 | Japan . |
| 3-123999 | 5/1991 | Japan . |
| 5-107073 | 4/1993 | Japan . |

OTHER PUBLICATIONS

Mizutani: "Car Electronics", Nippondenso No., Ltd., 1992 (See also Application p. 2).

Primary Examiner—Jacques H. Louis-Jacques
Assistant Examiner—Edward J. Pipala
Attorney, Agent, or Firm—Cushman Darby & Cushman IP Group of Pillsbury Madison & Sutro LLP

[57] ABSTRACT

Route costs are computed using the Dijkstra algorithm based on link information and connection information and a destination route is set based on a connection of links which has the least route cost. The route cost is set to sub-nodes of each connection link. Therefore, optimal routes can be set even though traffic regulations such as no right turns or the like exist on certain nodes.

27 Claims, 6 Drawing Sheets

FIG. 2A

| LINK ID | START COORD. | END COORD. | ROAD LEN. | ROAD TYPE | ROAD WID. |
|---|---|---|---|---|---|

FIG. 2B

| # OF LINKS(N) CONN. TO START PT. | LINK ID | TRAFFIC REG. | ... |
|---|---|---|---|

{ N LINKS }

FIG. 2C

| # OF LINKS(M) CONN. TO END PT. | LINK ID | TRAFFIC REG. | ... |
|---|---|---|---|

{ M LINKS }

FIG. 6

| SUB-NODE | COST | DESIG. FLAG |
|---|---|---|
| ⋮ | ⋮ | ⋮ |
| 1 − 1 | MAX → 「2」 | 0 → 1 |
| 1 − 2 | MAX → 「2」 | 0 → 1 |
| 2 − 1 | MAX → 「5」 | 0 → 1 |
| 2 − 2 | MAX → 「5」 | 0 → 1 |
| 2 − 3 | MAX → 「5」 | 0 → 1 |
| 3 − 1 | MAX → 「8」 | 0 → 1 |
| 3 − 2 | MAX → 「27」 | 0 → 1 |
| 3 − 3 | MAX → 「8」 | 0 → 1 |
| 4 − 1 | MAX → 「23」 | 0 → 1 |
| 4 − 2 | MAX → 「12」 | 0 → 1 |
| 4 − 3 | MAX → 「12」 | 0 → 1 |
| ⋮ | ⋮ | ⋮ |

NAVIGATION SYSTEM HAVING OPTIMAL DESTINATION ROUTE SETTING CAPABILITY

CROSS REFERENCE TO RELATED APPLICATION

This application is related to and claims priority from Japanese Patent Application No. Hei 7-131751, the contents of which are incorporated herein by reference.

BACKGROUND OF THE INVENTION

1. Field of the Invention

The present invention relates to a navigation system which performs cruising navigation to a destination by setting a route leading to the destination.

2. Description of Related Art

Conventional automotive navigation systems perform cruising navigation to a destination by highlighting a destination route on a road map or by giving vocal instructions as to which direction the vehicle should proceed in after setting the destination route from a starting position to the destination using the Dijkstra algorithm as disclosed in Shuji Mizutani, *Car Electronics* 187–88 (1992).

In this type of navigation system, a route cost (an assessed value of the route which is simply referred to hereinafter as cost) from the starting point to each node in the map is computed using link information describing links between nodes and link connection information which includes traffic regulation information. When all calculations on the costs of paths up to the destination are completed, the destination route is determined by connecting links which have the minimum costs. For example, equation 1 is used in calculating the cost of each link in the Dijkstra algorithm in conventional navigational systems.

$$Cost = distance\ between\ nodes\ (link\ length) \times road\ width\ coefficient \times road\ type\ coefficient \tag{1}$$

Here, the road width coefficient is a coefficient set according to road width and the road type coefficient is a coefficient set with respect to the road type such as a toll road or the like. The cost of the destination route can be computed by adding all costs obtained using Eq. 1.

The term "Dijkstra algorithm", as used herein and in the appended claims, refers to the above-described procedure.

However, in this cost calculation procedure using the above-described Dijkstra algorithm, when a vehicle cannot enter from a current link (entrance link) to a next link (exit link) because of traffic regulations such as no left/right turn, one-way road or the like, the setting of the determination route cannot be performed. Therefore, due to such traffic regulations, problems such as a roundabout route being set rather than an optimal route and the inability to set the destination route may occur.

This situation is explained hereinafter with reference to FIG. 7. In FIG. 7, there is a traffic regulation of no right turn from a link 2 to a link 6 and from a link 3 to a link 5 (in the Figure, an "x" with an arrow emanating therefrom indicates a prohibited movement). In the same Figure, an ideal route from a current position to a destination extends from the current position to the destination via a node 1, the link 3, a node 4, a link 4, a node 3 and the link 6.

However, according to the Dijkstra algorithm, since the route is set to minimize costs from the current position to each node, when the cost up to node 3 via link 2 from the node 1 is smaller than the cost up to node 3 from node 1 via the link 3, the node 4 and the link 4, the cost of the node 3 is determined based on the former cost.

Therefore, the route of the node 3 from the node 1 to the link 2 is set as the route to node 3. In FIG. 7, since right turns are prohibited from link 2 to link 6, the route to the destination via the node 3, the link 4, the node 4, the link 5, the node 5 and the link 6 is ultimately set as the final route, and therefore, the resulting route becomes longer than the ideal route described before.

SUMMARY OF THE INVENTION

In view of the foregoing problems in the prior art, it is a primary object of the present invention to provide an improved navigation system. It is another object of the present invention to provide a navigation system which sets a suitable route to a destination using the Dijkstra algorithm even if traffic regulations and the like are present.

To achieve these aims, a first aspect of the present invention provides a navigation system which includes a storage unit for storing link information describing links which connect nodes and have route costs, and link connection information; a destination setting unit for setting a destination; a route determination unit, which includes a route cost storage unit for storing the route cost of the links, for determining a destination route from a starting position to the destination by computing route costs based on the link information and the link connection information using the Dijkstra algorithm, selecting links to form a destination route that has a least cost, and updating the route costs; and a navigation unit for performing cruising navigation based on the thus-formed navigation route.

In this way, the route setting unit calculates costs from link information and connection information using the Dijkstra algorithm and sets a destination route by connecting links which have minimum costs.

When the costs are calculated, since the cost is set to the connection links connected to nodes, even though setting of the cost cannot be carried out for the connection link that has traffic regulations, the setting of the cost can be carried out for a connection link to which another link is connected without any traffic regulations. Thus, setting of the destination route can be carried out even with the existence of traffic regulations.

Another aspect of the present invention provides a navigation system wherein the route determination unit includes a unit for determining if entry to a specified link is possible or not based on the link connection information and allowing updates on the route costs of such a specified link when such entry is possible.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 2A–2C are block diagrams showing map data formats used in the preferred embodiment;

FIG. 6 is a table illustrating a sub-node data storage region in the storage unit shown in FIG. 1.

DETAILED DESCRIPTION OF PRESENTLY PREFERRED EXEMPLARY EMBODIMENT

A preferred embodiment of the present invention is hereinafter described with reference to the accompanying drawings.

Figure 1:
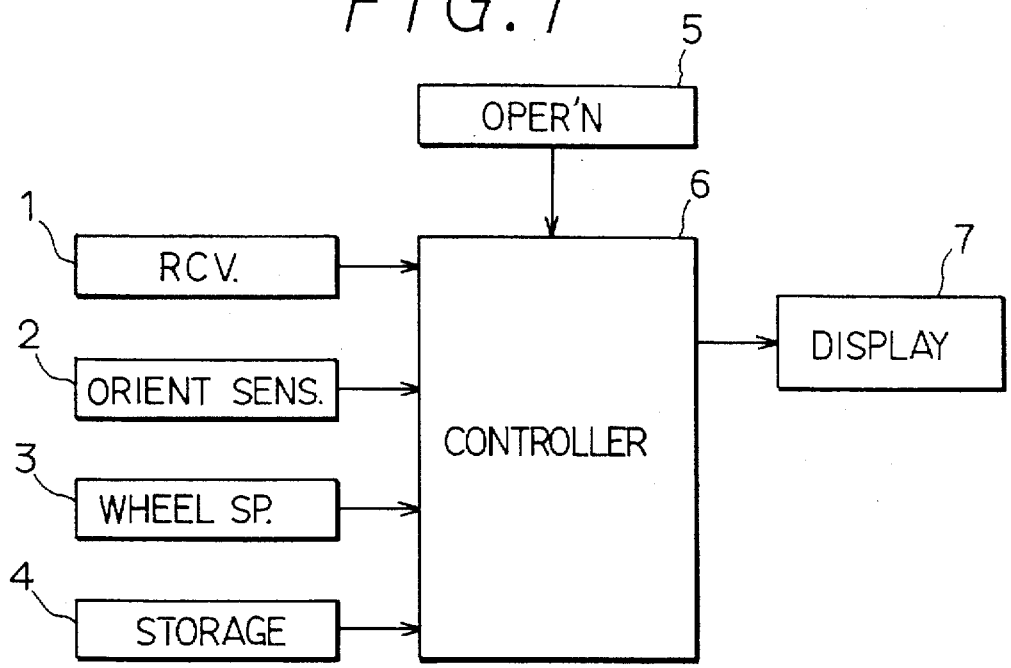
FIG. 1 is a block diagram of an overall construction according to an embodiment of the present invention.
Figure 7:
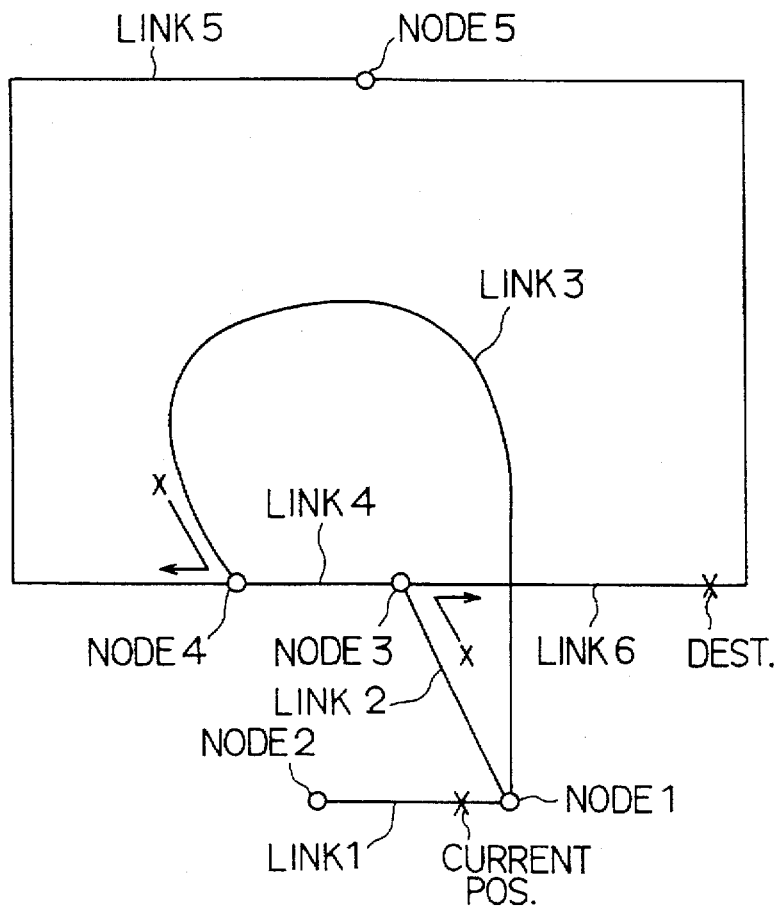
FIG. 7 is an explanatory view illustrating a problem in prior art navigation systems.

FIG. 1 shows an overall construction of a vehicular navigation system according to a preferred embodiment of the present invention.

To detect a vehicle's current position, the system of the present embodiment includes a GPS (Global Positioning System) receiver 1, an orientation sensor 2 and a wheel speed sensor 3. The GPS receiver 1 receives radio waves from a satellite and generates a signal indicating the present position of the vehicle. The orientation sensor 2 generates a direction signal after detecting a travelling direction of the vehicle using, for example, earth magnetism. The wheel speed sensor 3 generates a distance signal after detecting a travelled distance of the vehicle based on a rotational speed of vehicle wheels.

A storage unit 4 includes a storage medium such as CD-ROM or the like for storing map data or the like and provides the map data or the like to a controller 6.

An operation unit 5 is operated by a driver or the like of the vehicle and generates the necessary operational signals for navigation. The destination used in setting the destination route can be entered and set using this operation unit 5. For example, the destination can be set and entered by pointing to a position on a screen of a display unit 7 or entering an identification number representative of the position, e.g., the telephone number of the destination.

The controller 6 includes a microprocessor or the like and displays a road map of a travelling range of the vehicle on the display unit 7 based on signals from each of the above-described units and sensors. Moreover, the controller 6 computes the current position of the vehicle and executes a process for displaying the current position of the vehicle in the road map on the display unit 7. Furthermore, when road navigation to the destination is being carried out, the controller 6 sets the route to the destination and executes a process for highlighting the display of the destination route on the display unit 7.

The display unit 7 is provided on an instrument panel portion of the vehicle and displays the road map, the current position and the like. An LCD (liquid crystal display) unit, a CRT (cathode ray tube) display unit or the like can be used for the display unit 7.

FIGS. 2A–2C illustrate formats of the map data.

In the present embodiment, each road on the map is divided into a plurality of nodes such as intersections and the like with links set between nodes connected by the roads. The map is constructed by connecting such links. Therefore, the map data is constructed with formats shown in FIGS. 2A–2C.

Each link is constructed based on link information illustrated in FIG. 2A. The link information includes an identification number (link ID) for identifying the link, X and Y coordinates of the start and end points of the link, a link length, a road type (for indicating road type such as a toll road or the like) and road width data of the link.

Furthermore, each link has connection information shown in FIGS. 2B and 2C with each link itself serving as an entrance link and links connected to both ends of such an entrance link serving as exit links. FIG. 2B illustrates the format of start point side connection information and FIG. 2C illustrates the format of end point side connection information. The start point side connection information includes the number n of links connected to the start side node, link IDs thereof and information on the traffic regulations of all n links connected to the start side node. Similarly, the end point side connection information includes the number m of links connected to the end side node, link IDs thereof and information on the traffic regulations of all m links connected to the end side node.

Although the link connection information has been expressed in the above discussion as a table of links for purposes of simplicity, such link connection information is preferably implemented as a link list as would be obvious to those skilled in the art.

Traffic regulation information indicates whether or not it is possible to proceed from the present link (entrance link) to a connection link (exit link) and is set by using flags.

With such map data formats, setting of the destination route has been carried out as in the past using the Dijkstra algorithm. However, in the present embodiment, when calculating costs with reference to traffic regulation information, the calculation of the cost is given a direction to avoid the setting of a roundabout destination route described in the Related Art section. Concretely, in the present embodiment, cost calculations are performed after setting sub-nodes such as those illustrated in FIG. 3. Each sub-node is an imaginary node which enables the setting of costs to the connection links (exit links) connected to the nodes.

Figure 4:
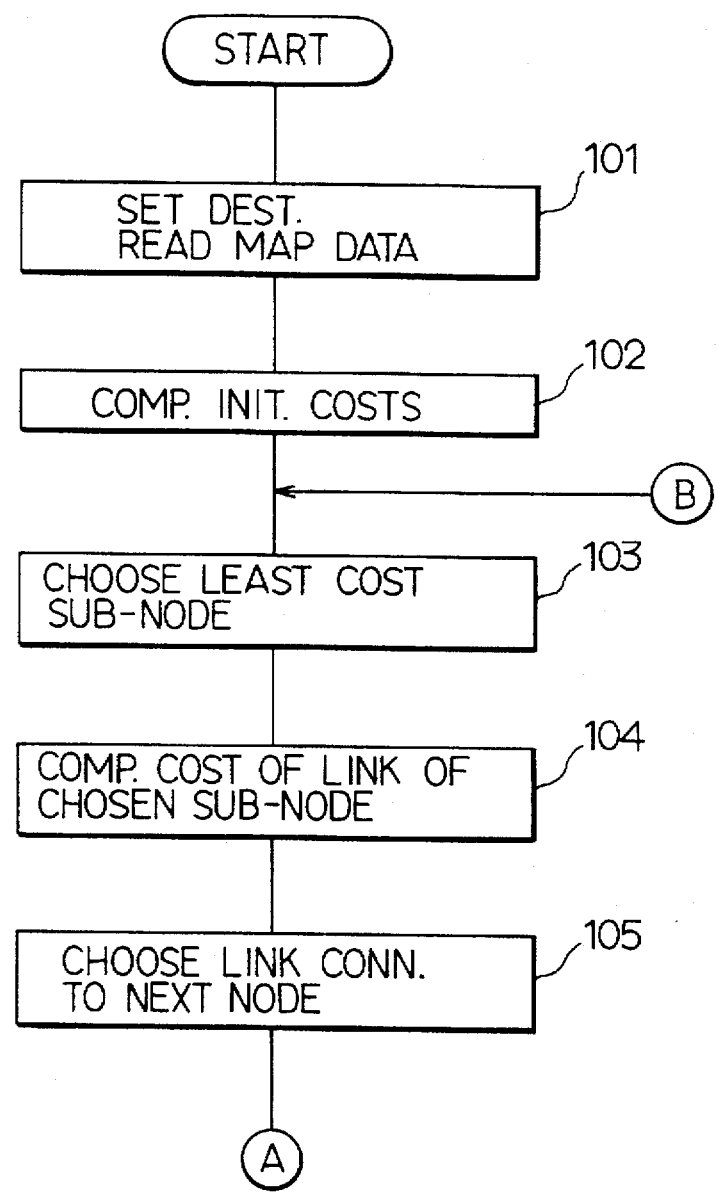
FIGS. 4 and 5 are flowcharts illustrating a destination route processing routine of the controller shown in FIG. 1.
Figure 5:
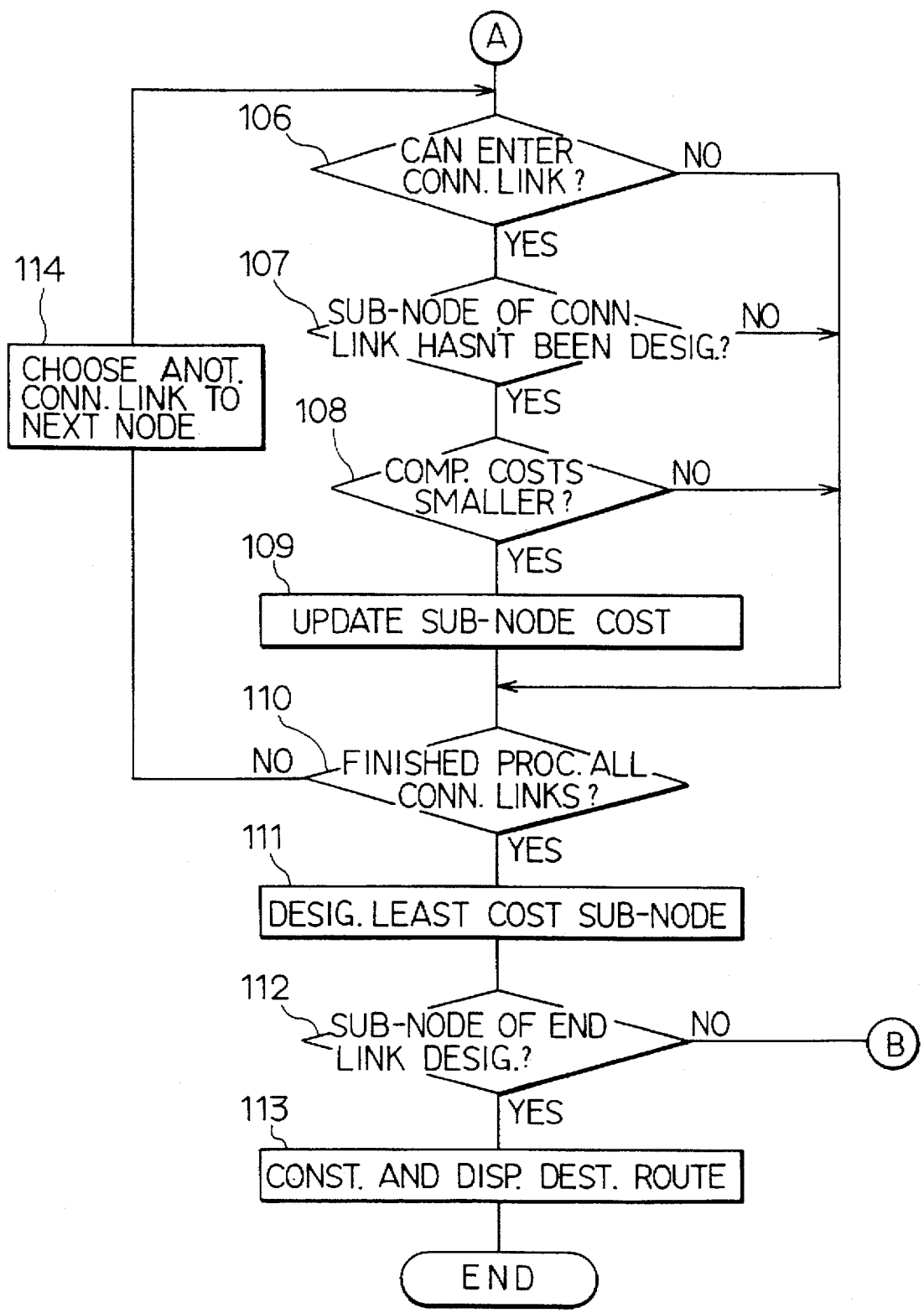

Using these sub-nodes, the destination route is set by a route setting process of the controller 6 as shown in FIGS. 4 and 5. As shown in FIG. 6, the cost of each sub-node on the connection links connected to each node is stored in a predetermined region of RAM in the controller 6. At the start of the process shown in FIGS. 4 and 5, all costs of the sub-nodes are initially set to a maximum value.

In the route setting process shown in FIG. 4, step 101 performs the destination setting and the map data reading process based on the operations of the operation unit 5 or the like. In setting the destination, when the destination is on one of the links, that link becomes a final link and when the destination is not on any one of the links, the link nearest to the destination becomes the final link. During the map data reading process, map data of a predetermined region which includes the set destination and the current position of the vehicle are read from the storage unit 4. The process of setting the destination route is carried out based on such read map data.

Based on the current position (starting position) of the vehicle, step 102 calculates the cost to both end nodes of the starting link. In this case, a position on the nearest link to the current position of the vehicle is set, the cost of the link is calculated using Eq. 1 and the initial cost from the current position to the nodes on each end of the link is calculated by proportional distribution based on the positional relation of such position with the respective end nodes of the link. Here, the initial costs of the sub-nodes on the connection links connected to both end nodes are set.

Figure 3:
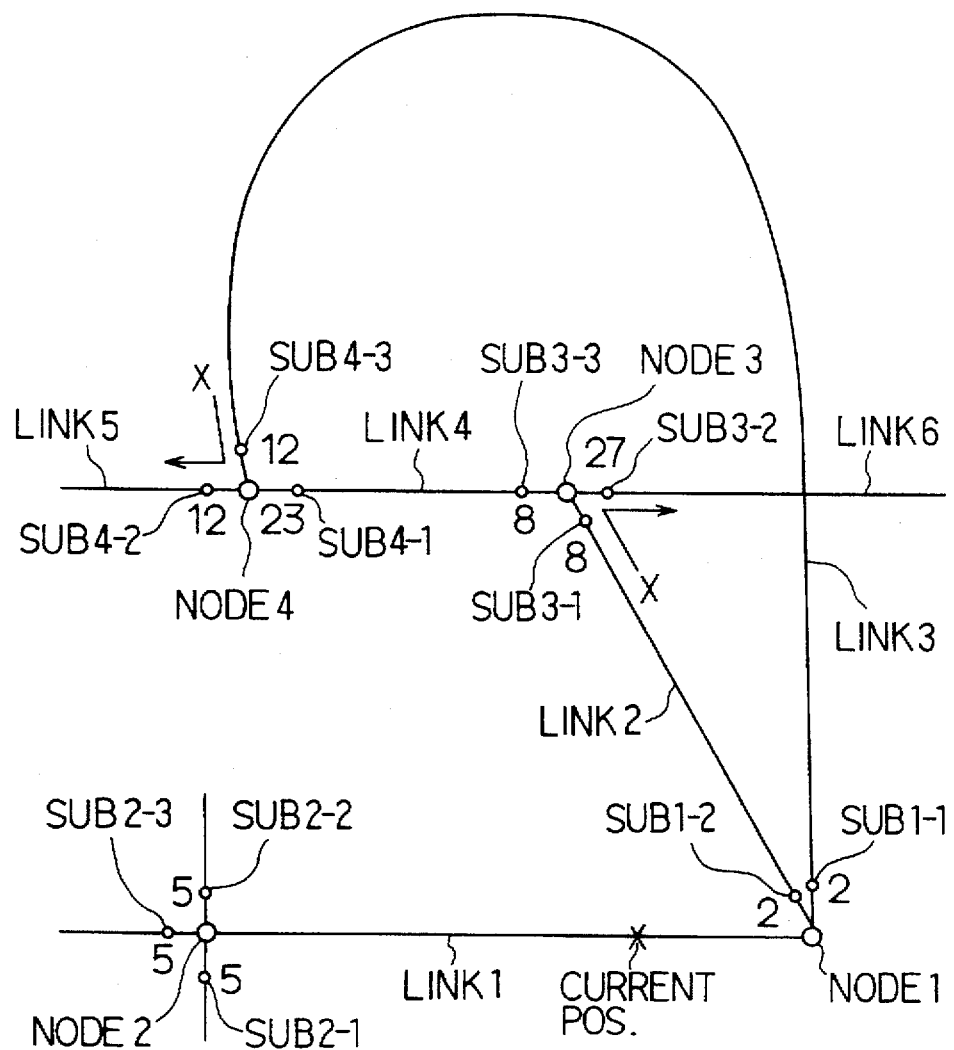
FIG. 3 is a schematic diagram of a typical map used in the embodiment.

In a link 1 which is the link nearest to the current position illustrated in FIG. 3, when the costs calculated by the proportional distribution with respect to both end nodes 1 and 2 are "2" and "5", respectively, the cost "2" is set to each of sub-nodes 1-1 and 1-2 of the node 1, and the cost "5" is set to each of sub-nodes 2-1 through 2-3 of the node 2.

Next, step 103 determines the sub-node which has the least cost among nondesignated sub-nodes. In FIG. 3, all sub-nodes are in a nondesignated state and a sub-node having the minimum value, for example, the sub-node 1-1 having the cost "2" is chosen. When there are a plurality of sub-nodes having the same minimum value, one of the plurality of least-cost sub-nodes is chosen.

Next, step 104 computes the cost of passing through the link having the chosen sub-node based on Eq. 1. In FIG. 3, the cost of the link 3 is calculated.

Step 105 determines the connection links connected to the end node of the link having the chosen sub-node based on the connection information. In FIG. 3, connection links 4 and 5 connected to the end node 4 of the link 3 having the sub-node 1-1 are chosen.

Thereafter, control goes to the process shown in FIG. 5 where steps 106 through 110 update the costs of the sub-nodes of all connection links determined in step 105. That is, step 106 determines if entry to the connection link is possible or not based on the traffic regulation information shown in FIG. 2; step 107 determines whether or not the sub-node at the connection link is nondesignated; and step 108 determines whether or not the current calculated cost of the sub-node of the connecting link is smaller than the cost obtained before. When the current calculated cost is smaller than the previous cost, step 109 updates the current cost of the sub-node.

It must be noted here that when the cost of the sub-node is updated, link information about previous links for reaching that sub-node is also stored.

In FIG. 3, the processes after step 106 are carried out with either of the connection links 4 and 5, and here, for example, processing is performed from the connection link 4. Since entry to the connection link 4 from the link 3 is possible and the sub-node 4-1 on the connecting link 4 is nondesignated, steps 106 and 107 give positive outputs. When step 105 calculates that the cost of the link 3 is "21", the cost of the sub-node 4-1 is "23" which is obtained by adding "2" (the cost of sub-node 1-1) to "21". Since the cost "23" of the sub-node 4-1 is smaller than the maximum value set initially, step 108 gives a positive output and step 109 updates the cost of the sub-node 4-1 to "23".

At this point, since the processing of all connection links is not yet finished, step 110 gives a negative output and the processing of the connection link 5 is carried out after choosing a new link in step 114 and returning to step 106. In this case, since entry to the connection link 5 from the link 3 is impossible due to traffic regulations, step 106 gives a negative output. Therefore, the cost of the sub-node 4-2 on the connection link 5 is not updated and remains at the maximum value.

When the processing of all the connection links is completed, step 110 gives a positive output and step 111 performs the process of designating the sub-node that has the least cost. That is, the designation flag, which is stored in the sub-node cost storage region illustrated in FIG. 6, of the sub-node designated in step 103 is set to "1". In FIG. 3, the designation flag of the sub-node 1-1 is set.

Next, step 112 determines whether or not the sub-node on the final link has been designated. If not, then control goes back to step 103 shown in FIG. 4.

As described above, the sub-node having the minimum value is chosen one by one from among the nondesignated sub-nodes, the calculation of the cost of the link with the sub-node having the minimum value is executed and the process of updating the costs of the sub-nodes of the connection links connected to the end node of the link is carried out.

In FIG. 3, when the cost of the sub-node 1-2 becomes the smallest of the node costs during updates of the minimum cost value and the cost of the link 2 is "6", the cost of the sub-node 3-3 is set to "8" which is obtained by adding "2" (the cost of the sub-node 1-2) to "6" (the cost of the link 2); however, renewing of the cost of sub-node 3-2 is not carried out because of the no right turn traffic regulation. When the cost of the link 4 is "4", the costs of the sub-node 4-2 and 4-3 are updated to "12" which is obtained by adding "8" (the cost of the sub-node 3-3) to "4" (the cost of the link 4).

Further, when the cost of the sub-node 4-1 becomes "23" which is the minimum value and the cost of the link 4 is "4", the cost of the sub-node 3-2 on the connection link 6 is updated to "27" which is obtained by adding "23" (the cost of the sub-node 4-1) to "4" (the cost of the link 4). Conventionally, when the cost of the node 3 is set, for example, to "8" and the cost of the node 3 after passing through the link 4 is "27", cost "27" is ignored, so that setting of the ideal route described before in the related art section cannot be carried out. On the other hand, in the present invention, since sub-nodes are provided at each connecting link with respect to each node, the cost is set to the route from the link 4 leading to the link 6.

Following the process of step 111, the designation flag of each sub-node is set sequentially one by one.

When the sub-node on the final link is designated and the sub-node 3-2 is on the route with the minimum cost value, the route from the link 4 to the link 6 is included in the destination route. That is, in FIG. 6, an ideal route from the current position to the destination via the node 1, the link 3, the node 4, the link 4, the node 3 and the link 6 is set.

When the sub-node of the final link is designated, step 112 gives a positive output and control goes to step 113 and the route having the minimum cost value is tracked backwards from the destination to the starting position. Then, the link IDs of the route are set starting from the starting position leading up to the destination and with such links, the destination route is highlighted on the display unit 7.

In the present invention, while calculation of the route with no U-turns is executed, the calculation can also be carried out with U-turns. For example, in FIG. 3, when making a U-turn in the link 2 after entering the same link from the node 1, this case will be treated as if one has reached node 3 from link 2 and then returned to the link 2 and so the cost of the sub-node 3-1 is updated to "8".

Further, although navigation is carried out by displaying the set destination route on the display unit 7, the navigation can be carried out through voice instruction.

Although the present invention has been described in connection with preferred embodiments thereof with reference to the accompanying drawings, it is to be noted that various changes and modifications will become apparent to those skilled in the art. Such changes and modifications are to be understood as being within the scope of the present invention as defined by the appended claims. For example, aside from a microprocessor-based implementation, each function of each step in the flowcharts illustrated in FIGS. 4 and 5 can also be implemented using a hardwired logic circuit construction. Additionally, the routines disclosed herein can be stored in computer readable medium such as CD-ROM, floppy disk, RAM or the like.

What is claimed is:

1. A navigation system comprising:

storage means for storing link information of links which connect nodes of a map and have route costs, and link connection information;

destination setting means for setting a destination in said map;

route determination means, which includes route cost storage means for storing said route costs of said links, for determining a destination route from a starting position to said destination set by said destination setting means by computing route costs based on said link information and said link connection information using a Dijkstra algorithm and by selecting links which form said destination route that have a least cost as determined by calculating an individual route cost, for every link connected to nodes in said destination route, of travel from said node to said link, and for individually updating said route costs for links connected to said nodes in said destination route; and navigation means for performing cruising navigation based on said navigation route.

2. A navigation system according to claim 1, said route determination means including:

route cost updating means for updating said route costs; and determining means for determining whether entry to a specified link is possible based on said link connection information and allowing said route cost updating means to update a route cost of said specified link when such entry is possible.

3. A navigation system according to claim 1, wherein said route determination means is for updating said route costs of said links in accordance with a direction of entry to said links.

4. A navigation system according to claim 1, wherein said route determination means is for updating a route cost of a specified link with respect to a direction from a specified node to said specified link.

5. A navigation system according to claim 4, wherein said route cost storage means stores route costs for each of said links.

6. A navigation system according to claim 4, wherein said route costs are initially set to a predetermined maximum value and can be updated to smaller values.

7. A navigation system according to claim 5, wherein:

said route costs are initially set to a predetermined maximum value; and said route cost determination means is for updating said route cost of said specified link to a value smaller than said predetermined maximum value.

8. A navigation system according to claim 1, wherein:

said link information includes at least one of link identification code, link start coordinate, link end coordinate, link length, link type and link width; and said link connection information includes traffic regulation information.

9. A navigation system according to claim 4, wherein:

said link information includes at least one of link identification code, link start coordinate, link end coordinate, link length, link type and link width; and said link connection information includes traffic regulation information.

10. A navigation system according to claim 5, wherein said route determination means is for updating costs of said links in accordance with a direction of entry to said links.

11. A computer program product for determining routes in a map, said computer program product comprising:

first computer readable program code means for causing a computer to read link information of links that connect nodes and link connection information which includes traffic regulation information from a storage medium;

second computer readable program code means for causing said computer to select a node from among nondesignated nodes read by said first computer readable program code means so that a route cost from a starting position to a destination is minimal;

third computer readable program code means for causing said computer to compute a cost for passing through specified links connected to nondesignated nodes and for individually computing and storing a route cost of travel from said nodes to each specified link connected to said nodes; and fourth computer readable program code means for causing said computer to repeatedly execute said selection and computation operations and for updating said route costs for links connected to said nodes in said destination route.

12. A method of navigating a vehicle using a map defined by a plurality of nodes connected by links from a starting position of said vehicle to a destination position of said vehicle, said nodes and links being representative of possible paths of travel of said vehicle, said method comprising the steps of:

selecting a node most proximate to said vehicle starting position as a vehicle starting node and as a current node;

selecting node most proximate to said vehicle destination position as a vehicle destination node;

computing route costs from said current node to all target nodes connected to said current node via a single link;

for each of said target nodes connected to said current node via a single link, sub-node associating said route cost from said vehicle starting position to a sub-node of said target node and a route from said vehicle starting position to said sub-node of said target node having said route cost with said sub-node of said target node if said route cost is less than a route cost already associated with said sub-node and movement from said current node to said sub-node is permitted along said route;

target node associating with each of said target nodes a smallest route cost and a path from said vehicle starting position to said target node providing said smallest route cost of sub-nodes of said target node;

selecting a node of said plurality of nodes in said map which has a route cost not greater than route costs of all other nodes in said plurality of nodes as a least cost node;

when said least cost node has not been selected as a current node, selecting said least cost node as said current node and repeating said computing and associating steps;

when said least cost node has been selected as a current node and a node, other than said vehicle destination node, which has not been selected as a current node has a route cost associated therewith which is less than a route cost of said vehicle destination node, selecting said non-selected node other than said vehicle destination node as said current node and repeating said computing and associating steps; and when said least cost node has been selected as a current node and a node, other than said vehicle destination node, which has not been selected as a current node has a route cost associated therewith which is not less than a route cost of said vehicle destination node, selecting a path associated with said vehicle destination node as a least-cost path from said vehicle starting position to said vehicle destination position.

13. The method of claim 12, said sub-node associating step comprising the step of sub-node associating said route cost from said vehicle starting position to said target node and a route from said vehicle starting position to said target node having said route cost with a sub-node of said target node most proximate to said current node if movement from said current node to said target node is permitted as indicated by traffic regulation information associated with a current-target link connecting said current node and said target node.

14. The method of claim 13, said traffic regulation information being indicative of a permissible direction of travel of said vehicle on said current-target link.

15. The method of claim 13, said traffic regulation information being indicative of a permissible direction of turning of said vehicle from a last link in a least cost path from said starting position to said current node to said current-target link.

16. The method of claim 12, further comprising the step of determining said starting position based on signals from at least one of a global positioning system, a vehicle orientation sensor, and a vehicle speed sensor.

17. The method of claim 12, further comprising the step of inputting a user-provided indication of said destination position.

18. The method of claim 12, further comprising the step of generating a user-perceptible description of said least cost path.

19. The method of claim 12, further comprising the step of generating a user-perceptible description of a position of said vehicle relative to said least cost path.

20. A vehicle navigation system comprising:
a storage device storing data representative of a map defined by a plurality of nodes connected by links from a starting position of said vehicle to a destination position of said vehicle, said nodes and links being representative of possible paths of travel of said vehicle; and
microprocessor means for:
reading said data representative of said map stored in said storage device;
selecting a node most proximate to said vehicle starting position as a vehicle starting node and as a current node;
selecting node most proximate to said vehicle destination position as a vehicle destination node;
computing route costs from said current node to all target nodes connected to said current node via a single link;
for each of said target nodes connected to said current node via a single link, sub-node associating said route cost from aid vehicle starting position to a sub-node of said target node and a route from said vehicle starting position to said sub-node of said target node having said route cost with said sub-node of said target node if said route cost is less than a route cost already associated with said sub-node and movement from said current node to said sub-node is permitted alone said route;
target node associating with each of said target nodes a smallest route cost and a path from said vehicle starting position to said target node providing said smallest route cost of sub-nodes of said target node;
selecting a node of said plurality of nodes in said map which has a route cost not greater than route costs of all other nodes in said plurality of nodes as a least cost node;
when said least cost node has not been selected as a current node, selecting said least cost node as said current node and repeating said computing and associating functions;
when said least cost node has been selected as a current node and a node, other than said vehicle destination node, which has not been selected as a current node has a route cost associated therewith which is less than a route cost of said vehicle destination node, selecting said non-selected node other than said vehicle destination node as said current node and repeating said computing and associating functions; and
when said least cost node has been selected as a current node and a node, other than said vehicle destination node, which has not been selected as a current node has a route cost associated therewith which is not less than a route cost of said vehicle destination node, selecting a path associated with said vehicle destination node as a least-cost path from said vehicle starting position to said vehicle destination position.

21. The system of claim 20, wherein said microprocessor means is for sub-node associating said route cost from said vehicle starting position to said target node and a route from said vehicle starting position to said target node having said route cost with a sub-node of said target node most proximate to said current node if movement from said current node to said target node is permitted as indicated by traffic regulation information associated with a current-target link connecting said current node and said target node.

22. The system of claim 21, said traffic regulation information being indicative of a permissible direction of travel of said vehicle on said current-target link.

23. The system of claim 21, said traffic regulation information being indicative of a permissible direction of turning of said vehicle from a last link in a least cost path from said starting position to said current node to said current-target link.

24. The system of claim 20, further comprising:
vehicle movement indicator means for generating at least one of a positioning signal representative of a position of said vehicle relative to said map, a vehicle orientation signal representative of an orientation of said vehicle, and a vehicle speed signal representative of a speed of said vehicle as an output;
wherein said microprocessor means is further for determining said starting position based on said output of said vehicle movement indicator means.

25. The system of claim 20, further comprising input means for inputting a user-provided indication of said destination position.

26. The system of claim 20, further comprising output means for generating a user-perceptible description of said least cost path.

27. The system of claim 20, further comprising output means for generating a user-perceptible description of a position of said vehicle relative to said least cost path.

* * * * *